(12) United States Patent
Rao et al.

(10) Patent No.: US 11,635,879 B2
(45) Date of Patent: *Apr. 25, 2023

(54) SYSTEMS AND METHODS FOR CONTENT SHARING THROUGH EXTERNAL SYSTEMS

(71) Applicant: OPEN TEXT CORPORATION, Waterloo (CA)

(72) Inventors: Mahesh Bangalore Shankar Rao, Mississauga (CA); Pardeep Kumar, Bangalore (IN); Panchakshrappa Pramod, Bangalore (IN); Prashantha Hanumanthappa, Bangalore (IN); Vikash Sharma, Bangalore (IN); Minu Gukanti, Bangalore (IN)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,783

(22) Filed: Nov. 30, 2021

(65) Prior Publication Data

US 2022/0083185 A1 Mar. 17, 2022

Related U.S. Application Data

(63) Continuation of application No. 16/854,536, filed on Apr. 21, 2020, now Pat. No. 11,194,451, which is a (Continued)

(51) Int. Cl.
*G06F 3/0484* (2022.01)
*G06F 16/182* (2019.01)
(Continued)

(52) U.S. Cl.
CPC .......... *G06F 3/0484* (2013.01); *G06F 3/0481* (2013.01); *G06F 3/0482* (2013.01);
(Continued)

(58) Field of Classification Search
CPC .... G06F 3/0481; G06F 3/0482; G06F 3/0484; G06F 9/541; G06F 9/547; G06F 16/183;
(Continued)

(56) References Cited

U.S. PATENT DOCUMENTS 9,104,742 B1 * 8/2015 Wei .................. G06F 16/275
9,703,800 B1 * 7/2017 Korshunov ............. H04L 63/08
(Continued)

OTHER PUBLICATIONS

Office Action issued for U.S. Appl. No. 15/902,311, dated Jan. 18, 2022, 18 pages.
(Continued)

*Primary Examiner* — Jeong S Park
(74) *Attorney, Agent, or Firm* — Sprinkle IP Law Group

(57) ABSTRACT

Disclosed are mechanisms for sharing content through content consumption systems. A sharing module publishes content in a share and metadata associated therewith to a content consumption system external to a managed repository. The share represents a folder or directory in the managed repository. The publication can be made through application programming interface (API) calls handled by a first sharing module API, a repository API, a second sharing module API, and a content consumption system API. These APIs together provide a one-to-one mapping of communications protocols used by the managed repository and the external system. The share in the managed repository and the share published to the content consumption system are synced and any conflict between the two is detected and resolved. The shared content can be repatriated back to the managed repository and the shared version deleted from the content consumption system.

20 Claims, 5 Drawing Sheets

Related U.S. Application Data continuation of application No. 15/906,846, filed on Feb. 27, 2018, now Pat. No. 10,635,272.

(60) Provisional application No. 62/529,617, filed on Jul. 7, 2017.

(51) Int. Cl.

| | | |
|---|---|---|
| *G06F 16/176* | (2019.01) | |
| *G06F 3/0481* | (2022.01) | |
| *G06F 3/0482* | (2013.01) | |
| *H04L 67/1095* | (2022.01) | |
| *G06F 40/166* | (2020.01) | |
| *G06F 40/197* | (2020.01) | |
| *G06F 16/178* | (2019.01) | |
| *G06F 9/54* | (2006.01) | |
| *H04L 41/12* | (2022.01) | |
| *H04L 41/22* | (2022.01) | |
| *H04L 43/045* | (2022.01) | |
| *H04L 67/10* | (2022.01) | |
| *H04L 67/141* | (2022.01) | |
| *H04L 67/02* | (2022.01) | |
| *H04L 67/01* | (2022.01) | |

(52) U.S. Cl.
CPC ............. *G06F 9/541* (2013.01); *G06F 9/547* (2013.01); *G06F 16/176* (2019.01); *G06F 16/178* (2019.01); *G06F 16/1774* (2019.01); *G06F 16/183* (2019.01); *G06F 40/166* (2020.01); *G06F 40/197* (2020.01); *H04L 41/12* (2013.01); *H04L 41/22* (2013.01); *H04L 43/045* (2013.01); *H04L 67/10* (2013.01); *H04L 67/1095* (2013.01); *H04L 67/01* (2022.05); *H04L 67/02* (2013.01); *H04L 67/141* (2013.01)

(58) Field of Classification Search
CPC .. G06F 16/1774; G06F 16/176; G06F 16/178; G06F 40/166; G06F 40/197; H04L 41/12; H04L 41/22; H04L 43/045; H04L 67/01; H04L 67/02; H04L 67/10; H04L 67/1095; H04L 67/141

See application file for complete search history.

(56) References Cited

U.S. PATENT DOCUMENTS

| | | | |
|---|---|---|---|
| 10,223,328 B1* | 3/2019 | Wei | G06F 16/178 |
| 10,635,272 B2* | 4/2020 | Rao | G06F 16/183 |
| 11,194,451 B2* | 12/2021 | Rao | H04L 41/12 |
| 2007/0226169 A1* | 9/2007 | Solyanik | G06F 16/1734 |
| | | | 707/E17.031 |
| 2009/0210459 A1* | 8/2009 | Nair | G06F 16/93 |
| | | | 707/999.203 |
| 2010/0031149 A1 | 2/2010 | Gentile | |
| 2010/0179984 A1 | 7/2010 | Sebastian | |
| 2013/0318589 A1 | 11/2013 | Ford et al. | |
| 2014/0047560 A1 | 2/2014 | Meyer et al. | |
| 2014/0108505 A1* | 4/2014 | Li | H04L 67/1095 |
| | | | 709/203 |
| 2014/0189818 A1 | 7/2014 | Meyer | |
| 2014/0245015 A1 | 8/2014 | Velamoor et al. | |
| 2015/0134795 A1 | 5/2015 | Theimer et al. | |
| 2015/0134808 A1 | 5/2015 | Fushman et al. | |
| 2015/0135337 A1 | 5/2015 | Fushman et al. | |
| 2015/0163206 A1 | 6/2015 | McCarthy et al. | |
| 2015/0310188 A1 | 10/2015 | Ford et al. | |
| 2017/0041296 A1 | 2/2017 | Ford et al. | |
| 2017/0220657 A1* | 8/2017 | Nivala | G06F 16/27 |
| 2018/0048658 A1* | 2/2018 | Hittel | G06F 21/565 |
| 2018/0189369 A1 | 7/2018 | Baek et al. | |
| 2019/0087432 A1 | 3/2019 | Sion et al. | |
| 2022/0334696 A1 | 10/2022 | Hawa et al. | |

OTHER PUBLICATIONS

Office Action issued for U.S. Appl. No. 15/902,311, dated Jun. 29, 2022, 18 pages.

Office Action issued for U.S. Appl. No. 15/902,311, dated Oct. 17, 2022, 19 pages.

* cited by examiner

SYSTEMS AND METHODS FOR CONTENT SHARING THROUGH EXTERNAL SYSTEMS

CROSS-REFERENCE TO RELATED APPLICATION(S)

This application is a continuation of, and claims a benefit of priority under 35 U.S.C. § 120 from, U.S. patent application Ser. No. 16/854,536, filed Apr. 21, 2020, issued as U.S. Pat. No. 11,194,451, entitled "SYSTEMS AND METHODS FOR CONTENT SHARING THROUGH EXTERNAL SYSTEMS," which is a continuation of, and claims a benefit of priority under 35 U.S.C. § 120 from, U.S. patent application Ser. No. 15/906,846, filed Feb. 27, 2018, issued as U.S. Pat. No. 10,635,272, entitled "SYSTEMS AND METHODS FOR CONTENT SHARING THROUGH EXTERNAL SYSTEMS," which claims a benefit of priority from U.S. Provisional Application No. 62/529,617, filed Jul. 7, 2017, entitled "SYSTEMS AND METHODS FOR CONTENT SHARING THROUGH EXTERNAL SYSTEMS," all of which are hereby fully incorporated herein by reference for all purposes.

TECHNICAL FIELD

This disclosure relates generally to the field of enterprise information management (EIM). More particularly, this disclosure relates to EIM systems operating in networked computing environments. Even more particularly, this disclosure relates to sharing, through external systems that operate in a cloud computing environment, content or any information that is managed by a restricted storage system, repository, or an EIM system that operates in an enterprise computing environment.

BACKGROUND OF THE RELATED ART

Enterprise information management (EIM) is a particular technical field in Information Technology (IT). EIM combines many enterprise class systems such as enterprise content management (ECM), business process management (BPM), customer experience management (CEM), and business intelligence (BI). An EIM system may utilize a content server to, among other things, store, and manage an organization or enterprise's digital assets such as content and documents (which are collectively referred to herein as "managed objects"). To protect these managed objects, the content server would operate behind the enterprise's firewall and be particularly configured so that only authorized users may have secure access to the managed objects. Often, content servers are located on the premises (e.g., a server machine or machines on which a content server is implemented would be physically installed in a building) of the organization or enterprise. This is sometimes referred to as "on-prem."

As an enterprise continues to grow, so does the need for enterprise users to collaborate and/or share files with external users. Since external users are generally not authorized to access the enterprise's EIM system, they cannot view and/or edit any file managed by the enterprise's content server. When a need arises for an external user to review and/or edit a file, one common option is for an enterprise user to log into the enterprise content server from within the enterprise network where the content server resides, retrieve the file, and share a copy the file with an external user by email or through a cloud-based storage system that is open to the public.

Once that copy is shared outside of the enterprise network, it is no longer under management by the content server. The content server has no way of tracking the shared copy, getting the shared copy back to the content server, and/or updating the original file to reflect any changes made to the shared copy. Since this kind of "copy-and-set-free sharing" can pose a security risk, the sharing feature may be disabled in a content server to prevent sharing certain files, folders, directories, etc. However, this means that the need to share externally is not addressed. Embodiments disclosed herein can address this need and more.

SUMMARY OF THE DISCLOSURE

A goal of the invention is to improve EIM systems by providing a safe and secure way to expose content managed by an "on-prem" EIM system operating in an enterprise computing environment. This goal can be achieved in a sharing module running on a feature rich content server platform where content server users can safely and securely share and collaborate on EIM-managed content with external participants through an external system such as a cloud-based storage system. In this disclose, the term "platform" broadly refers to a particular structure on which multiple software products (i.e., applications) can be built within the same technical framework. The structure, in this case, includes both hardware and software components.

Embodiments disclosed herein can be implemented on many suitable EIM systems. Documentum, available from OpenText, headquartered in Canada, can be a non-limiting example of a feature rich ECM platform on which some embodiments disclosed herein can be implemented. For the purpose of illustration, and not of limitation, OpenText™ Core ("Core") can be a non-limiting example of an external system (i.e., a system that is external to an EIM system or content server operating in an enterprise computing environment, e.g., a cloud-based storage system operating in a network computing environment that is external to the enterprise computing environment). Core operates in a cloud computing environment and provides personal cloud storage for securely sharing and collaborating on files. These files are stored by Core in the cloud computing environment (e.g., on a tenant server computer in a multitenancy platform operated by a cloud-hosting service provider such as OpenText™ Cloud) which is separate and independent from the enterprise computing environment. Skilled artisans appreciate that embodiments disclosed herein are not limited to Core and can work well with any external systems, including any third-party cloud storage system operating in a cloud computing environment external to an EIM system disclosed herein operating in an enterprise computing environment behind a firewall thereof.

In today's highly connected world, enterprise users often collaborate with other individuals and organizations for various purposes. This collaboration requires the sharing of authorized content (e.g., managed enterprise content that has been reviewed and approved for sharing outside of the enterprise) in the repository with collaborators at the systems of content consumption. This demography of collaborators would otherwise not have access to the content because of system limitations. For example, an EIM system operating at the backend of an enterprise computing environment is not directly connected to a frontend content delivery application such as a faxing application. Further, restrictions such as user privileges with respect to external users may limit how content can be exchanged/shared between collaboration participants. For instance, User John may prefer to get information in a fax, but existing EIM systems are not directly connected with a faxing application. As another example, User Cathy who is a co-author of an artifact may want to work on the latest copy of the artifact and may want to use a file sync-n-share system to work from different devices. However, her publisher's repository is not directly connected with an external file sync-n-share application. These limitations and restrictions can adversely affect collaboration and reduce productivity/performance.

A previous solution attempted to address these issues by allowing a user to transfer content out of a repository using an external file sync-and-share service. However, this requires a complicated, hard-coded custom set up between a single repository and a single external system. Once set up, the single repository and the single external system have a tightly coupled relationship—the file sync-and-share service can only transfer content between the single repository and the single external system.

This kind of content sharing approach can limit the number of systems of content consumption (e.g., external systems to which content can be transferred). There is also a restriction on the number of repositories from where content can be transferred to these systems of content consumption. Another limitation is that it does not provide for transferring any metadata associated with the content that is being shared. Generally, an external system will create their own metadata, so they do not use source metadata.

In some embodiments, a method for sharing content managed by an EIM system through an external system may comprise receiving, by a sharing module, an instruction to publish a share to an external system, the share representing a folder or directory in a managed repository, the sharing module running on a server machine operating in an enterprise computing environment, the managed repository residing in the enterprise computing environment, the external system operating independently and external to the managed repository, the server machine having a processor and a non-transitory computer readable medium. The method may further comprise publishing, by the sharing module from the managed repository to the external system, objects in the share and metadata associated with the objects. In some embodiments, the metadata associated with the objects are generated in the EIM system that manages the managed repository to provide context to the objects. These are sometimes referred to as "source" metadata. Previously, when managed content is shared externally, such source metadata are not shared with and/or used by an external system.

In some embodiments, publication by the sharing module may include making a first application programming interface (API) call to retrieve the objects and the metadata from the share in the managed repository and making a second API call to communicate the objects and the metadata to the external system. In some embodiments, the first API call is made through a first sharing module API and a repository API, the first sharing module API interfacing the sharing module and the repository API, the repository API interfacing the first sharing module and the managed repository. In some embodiments, the second API call is made through a second sharing module API and an external system API, the second sharing module API interfacing the sharing module and the external system API, the external system API interfacing the second sharing module API and the external system. The repository API, the first sharing module API, the second sharing module API, and the external system API together provide a one-to-one mapping of communications protocols used by the managed repository and the external system.

In some embodiments, the instruction to publish is received by the sharing module automatically and programmatically from a scheduler in accordance with a share profile defined by an administrator of the managed repository. The share profile contains content sharing rules specified by the administrator as being applicable to the share, the scheduler running on the server machine. The content sharing rules may be characterized as a one-way sync rule set or a two-way sync rule set.

In some embodiments, responsive to the instruction to publish the share to the external system. A graph builder, which may be part of the sharing module, may build a first graph for the share. The first graph contains nodes representing the objects in the share at the time of publication.

In some embodiments, after the share is published to the external system, the sharing module monitors any changes to the share by performing a one-way sync or a two-way sync, on demand, continuously, or per a predetermined time interval, to sync the share in the managed repository and the shared published to the external system. The syncing operation returns an update to the share from the managed repository or the external system if a share profile dictates a one-way sync, or updates from both the managed repository and the external system if a share profile dictates a two-way sync.

In some embodiments, the method may further comprise building a second graph for the share based on a result from the syncing operation, detecting any change to the share by comparing the first graph for the share and the second graph for the share, determining whether any change to the share causes a versioning conflict for an object in the share, and if a versioning conflict for an object in the share is found, communicating conflicting versions of the object involved in the versioning conflict to a conflict resolver for conflict resolution. In some embodiments, a conflict resolution may include renaming a file extension of a first version of the conflicting versions of the object to thereby change a file type of the first version, presenting at least the first version of the object to a user through a user interface running on a user device, prompting the user to make a selection, through the user interface, on one of the conflicting versions of the object, and determining a resolved version of the object based on the user selection. The resolved version of the object can then be synced back to the managed repository, the external system, or both. This is so that the externally shared content will be in-sync with the version residing in the backend. When the need to externally share the content no longer exists, the externally shared content can be repatriated back to the managed repository. After the final sync operation, the version that had been published to the external system by the sharing module is deleted by the external system responsive to a request from the sharing module. The external system notifies its user(s) that the content at issue is no longer shared.

In some embodiments, the external system can be one of a plurality of external systems connected to the managed repository through the sharing module. Each external system of the plurality of external systems would have a one-on-one mapping between the managed repository and the each external system through a pair of sharing module APIs, a repository API specific to the managed repository, and an external system API specific to the each external system. Likewise, the managed repository can be one of a plurality of managed repositories connected to the sharing module.

Each managed repository of the plurality of managed repositories would be connected to the sharing module through a repository API specific to the each managed repository and a sharing module API such that, although the sharing module allows for multiple-to-multiple connections among managed repositories and external systems, each pair of a managed repository and an external system can have a specific one-to-one mapping relationship. This arrangement makes the underlying architecture extensible, adaptive, and flexible.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
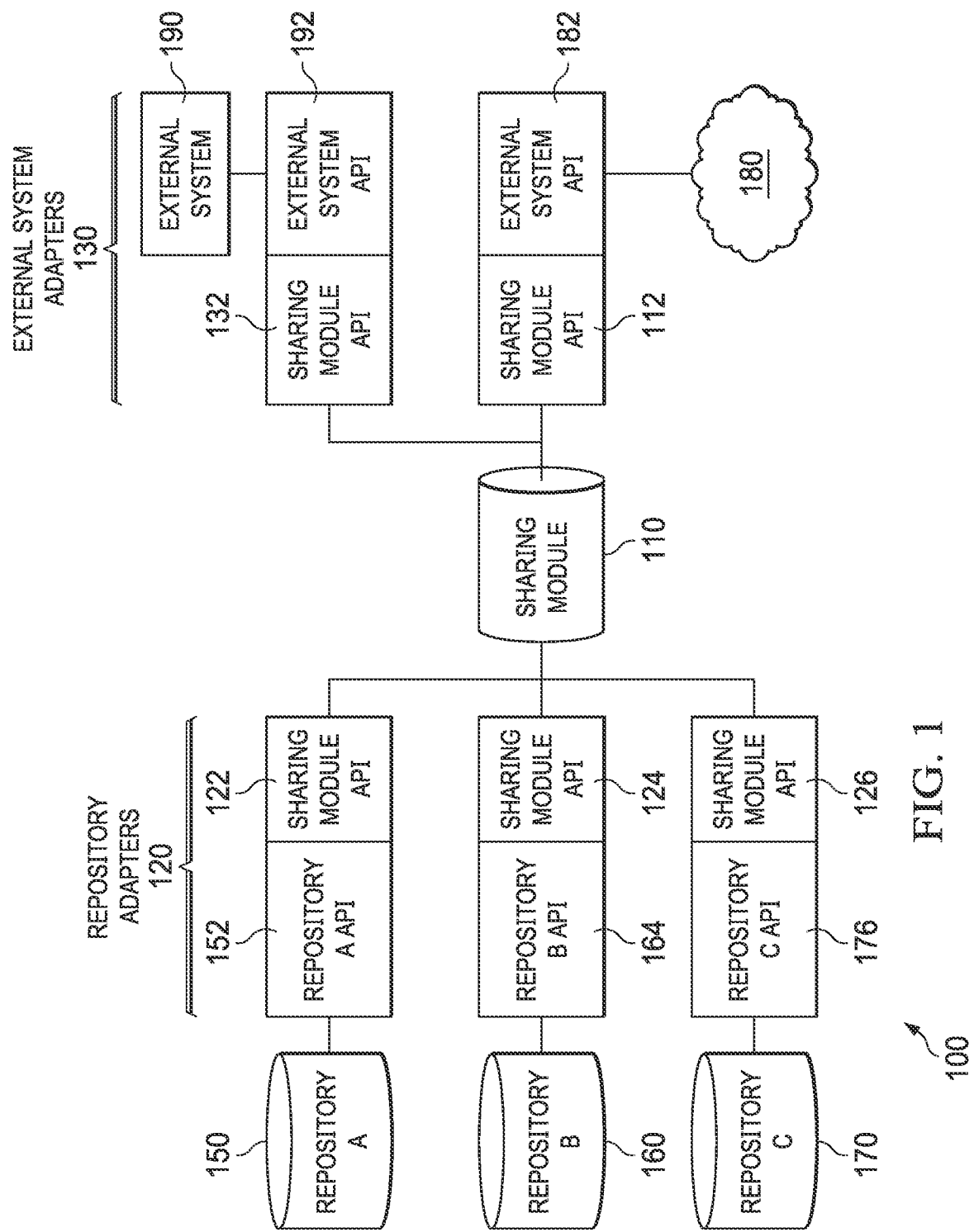
FIG. 1 depicts a diagrammatical representation of sharing content stored in managed repositories in an enterprise computing environment through a sharing module that connects the managed repositories with an external system according to some embodiments disclosed herein.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

A goal of this disclosure is to provide a feature-rich EIM platform operating in an enterprise computing environment where enterprise users can safely and securely share and collaborate on managed content (e.g., documents stored in a repository managed by an EIM system operating, safely and securely behind the enterprise's firewall, in the enterprise computer environment) with users who otherwise have no access to the managed content (e.g., external Core users and/or enterprise users who are not authorized users of the EIM system).

Sharing content with external participants/collaborators should not burden existing EIM users with having to learn how to navigate and use an external system. For security reasons, interactions between EIM users and the external system should be kept to a minimum. Instead, EIM administrators should control (e.g., through content sharing rules) how or when content is to be shared, who has access to sharing privileges, etc. Preferably, sharing content with external participants/collaborators should have a minimum or negligible impact on the EIM functionality, usability of the EIM system/repository by EIM users, and/or managed documents that have been shared.

In some embodiments, this and other goals can be realized in a sharing module strategically positioned between a repository layer and an external system layer. The sharing module can be located "on-prem" in an enterprise computing environment or hosted in a cloud computing environment.

The repository layer has one or more repositories, usually operating at the backend of an enterprise computing environment. These can be any suitable storage systems configured for storing managed objects, including managed content such as files, documents, applications, and any digital assets owned by the enterprise. These storage systems can be used and/or managed by various enterprise software systems, including various types of EIM systems, for instance, OpenText™ Content Server, Documentum, ApplicationXtender (AX), etc.

The external system layer has one or more external systems with which the sharing module is connected. As discussed above, a system external to a repository managed by an EIM system can be an on-prem external system or a cloud-based external system. An external system has the necessary hardware (e.g., server machine(s)) and software (e.g., a cloud- or web-based user interface) with storage(s) accessible by user devices, each of which having its own data storage such as a non-transitory computer readable-medium.

As discussed above, in some cases, an enterprise user may need to collaborate and/or share files with external users. For example, an employee "Engineer" of the enterprise may try to create a design specification for a new pump that will be delivered to a customer. The pump specification document is stored in a repository managed by Documentum that is owned and operated on-prem by the enterprise. However, Engineer needs some input from an external user "Contractor" who will be supplying parts to the pump. Contractor does not have access to Engineer's document in the Documentum repository, but Engineer needs Contractor to be able to edit and make changes to the pump specification document to include/update information on the parts supplied by Contractor. To solve this dilemma, Engineer could make a copy of the pump specification document stored in the Documentum repository and upload the copy to an external system accessible by Contractor. Additionally or alternatively, Engineer could email the copy of the pump specification document to Contractor.

Once a copy of managed content (e.g., the pump specification document in the above example) is made and shared (e.g., by email and/or uploading to an external system) outside of the enterprise, it is no longer under management by the ECM system (e.g., Documentum in the above example). Thus, an external user (e.g., Contractor in the above example) could freely view, modify, copy, store (e.g., in a storage of the external system and/or in a storage on the external user's device), and even share it with other users who otherwise would have no access to the managed content (e.g., Engineer's document in the above example) stored in the repository. Since the shared copy is not stored in the repository, the ECM system has no way of tracking the shared copy, getting the shared copy back to the repository, and/or updating the original file to reflect any changes made to the shared copy.

To an enterprise (or any entity with content management needs), this kind of "copy-and-set-free sharing" poses a security risk. Therefore, the sharing feature is usually disabled or turned off by default in an EIM system to prevent unauthorized sharing of certain files, folders, directories, etc. An administrator of the EIM system can enable sharing and assign sharing privileges to EIM users through an administrator user interface ("UI") of the sharing module.

Following the above example, suppose Engineer is granted a sharing privilege to share the pump specification document stored in the Documentum repository with Contractor through a designated external system such as Core. Engineer may place the pump specification document in a folder in the Documentum repository designated for sharing and provides information that identifies Contractor (i.e., information that identifies an external system user with whom the managed content is shared by an EIM user), for instance, an email address of Contractor. In this example, from the perspective of the sharing module, Engineer is the "shared-by" user and Contractor is the "shared-to" user. Alternatively, Engineer may designate a folder containing the pump specification document in the Documentum repository as a share that should be published to Core (or multiple external systems, as explained below) and accessible by "shared-to" user(s).

An administrator of the Documentum may specify to the sharing module, through the administrator UI, a share profile containing a list of shares (e.g., designated folders or directories in the Documentum repository) subject to certain content sharing rule(s) (e.g., content sharing rules that govern when content in a share is to be published or otherwise shared externally, when syncing is to occur, how often syncing is to occur, whether it is a one-way sync or a two-way sync, when the shared content is to be repatriated back into the repository, etc.). Such a share profile is created and maintained through the administrator UI. The sharing module's sharing and syncing functionality, further explained below, can be implemented as a sync-n-share service that can be included in many frontend user applications (e.g., client applications of EIM systems).

Using Core as an example of an external system, when content in a share in the Documentum repository is published by the sharing module to Core, everything in the share is provided to Core, along with information identifying "shared-to" user(s) and corresponding role(s). Depending upon the role assigned to a shared-to user, the shared-to user is allowed to view only (e.g., as a viewer) or edit (e.g., as a collaborator or contributor) the shared content. Core may store the shared content (e.g., in storage location(s) associated with the "shared-to" user(s)), notify the "shared-to" user(s) about the shared content, and return identifier(s) (internally used by Core) associated with the shared content to the sharing module. The unique identifier generated by Core to identify the copy internally can be stored by the sharing module in a database local to the sharing module for syncing purposes. Core is operable to notify any and all participants associated with the shared content and handle registration of any new Core users.

At this point, the shared content in the Documentum repository is the same as the shared content in Core (i.e., the content is shared between the Documentum repository and Core). Depending upon the shared content's share profile, the shared content may be subject to a one-way sync or a two-way sync performed by the sharing module. Syncing may occur continuously or at a time interval.

In a one-way sync, changes to the shared content can only be made on either the repository side or the external system side. In a two-way sync, changes to the shared content can be made on both the repository side and the external system side. That is, in a two-way sync, any modifications done to a version of the shared content in the external system by an external recipient can be retracted back to the repository. In some embodiments, modifications to a version of the shared content in the repository are also allowed. However, in a one-way sync, only one of the versions of the shared content can be modified or changed. In some embodiments, changes to the version of the shared content in the repository are moved to the external system, but no changes to the version of the shared content in the external system are allowed (i.e., the version of the shared content in the external system is read-only).

In some embodiments, once shared/published, the version of the shared content in the repository is prevented from being altered (i.e., the version of the shared content in the repository becomes read-only while it is shared externally) and changes to the version of the shared content in the external system are moved back to the repository. This scenario is illustrated in an example below.

Suppose the pump specification document that Engineer shared with Contractor through Core is subject to a one-way sync. This means that, in this example, once published by the sharing module to Core for Contractor to edit, the pump specification document stored in the share in the Documentum repository is made read-only and changes thereto can only be made through Core. This means that Engineer (or any user of Documentum) is not able to modify the pump specification document stored in the share in the Documentum repository, but Contractor (and Engineer, if Engineer is also a user of Core) can edit the copy through Core.

When Contractor has completed their inputs to the copy stored in Core, any final change is synced back by the sharing module to the Documentum repository to update the pump specification document. The copy stored in Core is then deleted. This process is referred to as repatriation. Repatriation of shared content can be triggered by a "shared-by" user (e.g., Engineer) or a content sharing rule set forth in the sharing profile associated with the shared content (e.g., a content sharing rule specifying a repatriation date, a time limit of external content sharing, or a condition that revokes a "shared-to" user's access to the shared content).

Skilled artisans recognize that, in another example of a one-way sync, the copy of the pump specification document stored in Core can be ready-only so that Contractor can view, but not alter or modify, the copy of the pump specification document stored in Core. Rather, changes are allowed to be made through Documentum (e.g., by Engineer or an authorized user of Documentum) and the changes are then synced by the sharing module to Core to update the copy of the pump specification document stored in Core.

As discussed above, it is very difficult to enable and manage external sharing from an ECM system to an external system outside of the ECM system. This is because enterprise file synchronization and sharing (EFSS) is a highly complex functionality and requires complicated integration between a repository inside of an enterprise and an endpoint system outside of the enterprise, as well as lengthy user setups for all involved. The sharing module disclosed herein can significantly reduce this complexity and minimize impact on existing repositories and ECM systems alike. The sharing module makes it possible for an ECM system repository to connect to an external system without requiring a fixed connection between the ECM system repository and the external system. This is further explained below with reference to FIG. 1.

It should be noted here that, while the example above describes sharing managed content between an employee of an enterprise and a contractor outside of the enterprise, sharing with internal users will also work seamlessly. That is, users internal to the enterprise computing environment can share documents with internal users who are also a member of the external system. Accordingly, an aspect of this invention is to utilize an external system as an extension of an EIM system that resides in an enterprise computing environment and operates behind a firewall of the enterprise. This extension allows sharing from a managed repository and using the external system as a secure, user-friendly collaboration platform to provide participants (external and/or internal to the enterprise) access to shared documents. For example, in a cloud-hosted external system such as Core, participants (internal as well as external) can readily access Core and collaborate on a document through Core, using Core's web client, mobile client, and desktop client apps running on disparate user devices.

To ensure security, all communications between the sharing module and the external system may utilize the Representational State Transfer (REST) protocol. In some embodiments, the sharing module may utilize the external system's REST layer as the API of choice for server-to-server interactions such as user lookup, share initiation, share revoke, etc. In some embodiments of a one-way sync, the sharing module makes all the outbound calls (e.g., REST API calls) to the external system. In such cases, no inbound connection from the external system back into the sharing module maybe required. In some embodiments, sharing scenarios maybe performed by the sharing module, driven manually by end users. In some embodiments, sharing scenarios maybe performed by the sharing module programmatically and automatically through a rules-based engine executing rules set forth in the sharing profile(s) stored in a database accessible by the sharing module (e.g., a local database).

In some embodiments, the sharing module (also referred to herein as a "sync-n-share connector") include new types of adapters (also referred to herein as "connecting interfaces") residing between the repository layer and the sharing module and between the sharing module and the external system layer. The sharing module enables movement of content between a managed repository and an external point of content consumption, for example, Core, Microsoft® OneDrive, Google Drive, and/or any cloud-based storage solutions/systems.

Embodiments described below leverage a new approach to enable enterprise users to share the content to a targeted demography of collaborators within and/or outside of an enterprise or organization. This new approach is realized in a new architecture where a standalone sharing module (also referred to as a centralized content delivery bus or controller, a file sync-n-share connector, or a synchronizer) can connect multiple repositories to multiple external systems. On the one hand, the sharing module is connected to one or more repositories through a layer of adapters referred to herein as repository adapters. On the other hand, the sharing module is connected to one or more external systems through a layer of adapters referred to herein as external system adapters. An example of this new architecture is illustrated in FIG. 1.

In the example of FIG. 1, architecture 100 comprises sharing module 110 that interfaces or otherwise connects managed repositories 150, 160, 170 with external systems 180, 190 through repository adapters 120 and external system adapters 130. Each repository adapter comprises a repository API (e.g., 152, 164, 176) and a sharing module API (e.g., 122, 124, 126). The repository API is configured for communicating with a respective repository and the sharing module API is configured for communicating with sharing module 110. Likewise, each external system adapter comprises a sharing module API (e.g., 112, 132) and an external system API (e.g., 182, 192). The external system API is configured for communicating with a particular external system, while the sharing module API is configured for communicating with sharing module 110.

In this way, repository adapters 120 represents a first interface layer between a sharing module and a content repository of an information management (IM) system operating in an enterprise computing environment, while external system adapters 130 represents a second interface layer between the sharing module and an external system operating in a network computing environment external to the enterprise computing environment.

Each of the first interface layer and the second interface layer has a pair of APIs, each of which is configured for a particular function. In the first interface layer, one API is configured for communicating with the content repository and another API is configured for communicating with the sharing module. In the second interface layer, one API is configured for communicating with the sharing module and another API is configured for communicating with the external system. That is, the first interface layer has a pair of APIs for each connection/interface between a content repository and the sharing module, as illustrated in FIG. 1. Similarly, the second interface layer has a pair of APIs for each connection/interface between the sharing module and an external system, as illustrated in FIG. 1.

In architecture 100, there are no fixed connections in between a managed repository and an external system. Rather, through the sharing module, multiple-to-multiple content sharing connections are possible among managed repositories and external systems, with a one-on-one mapping between each pair of a managed repository and an external system. In this way, a new managed repository can be readily added to architecture 100 by interfacing the new managed repository with the sharing module (independently of any external system) through a pair of APIs, one for communicating with the new managed repository and one for communicating with the sharing module. Likewise, an external system can be readily added to architecture 100 by interfacing the external system with the sharing module (independently of any managed repository at the backend) through a pair of APIs, one for communicating with the external system and one for communicating with the sharing module. Skilled artisans appreciate that architecture 100 is extensible and can be readily adapted to accommodate multiple managed repositories (managed by the same EIM system or different EIM systems), as well as multiple external systems.

Before describing the sharing module in detail, it may be helpful to understand a file sync-n-share service provided by the sharing module. Example use cases can include, but are not limited to, the following:

Use Case 1: Collaboration Through a File Sync-n-Share Service

Enigma is a publishing company that publishes journals in the public health care. Jane is an employee of Enigma, and works as an editor at Enigma. Jane collaborates with a group of reviewers at Enigma to review the journals that Enigma publishes. Bob is one of the reviewers with Enigma and works from a home office.

Enigma stores the drafts and other versions of these journals in a repository (e.g., Repository B in FIG. 1). Only employees of Enigma are given access to the repository. The repository is connected with an external file share system (e.g., external system 180). A user interface to the Journal library provides Jane with the ability to select and push the draft journals (through repository adapter 120, sharing module 110, and external system adapter 130) to specific recipients in the external file share system. To do so, Jane picks the content she wants Bob to review, select "share" and identify Bob as a reviewer of the content using the file sync and share service, and this journal is now available for Bob to view in the external system, also using the file sync-n-share service. Once Bob has completed the review, Jane repatriates the content back into the repository.

Use Case 2: Transmission of Managed Content as a Fax

Modicum is a mortgage agency that provides mortgage to qualifying applicants. Modicum stores the mortgage applications and related collaterals in an applications repository. Modicum services its customers through its field agents. Modicum arranges the mortgage for its customers through its lending partners' network. Anitha is a field agent with Modicum, works closely with Leon, a lending partner, and is now working on the mortgage application of Meera.

Through the period of processing the mortgage application for Meera, the agents for Modicum fax various documents for the applicants to sign, and also receive faxes of signed documents from applicants. These documents are stored in the applications repository at Modicum. Such applications and related collaterals are typically shared with one or more lending partners to get customers the best deal. The lending partners and mortgage agencies perform exchange of documents over a fax network.

Anita uses a web interface of a mortgage software system to review all the applications she is working on. The mortgage software system is configured with a file sync-n-share service provided by architecture 100. Anita believes that Leon can offer the best deal for Meera and contacts Leon. Leon wants to view the associated collaterals and verify that these documents are vetted by Meera. Since the repository at Modicum is connected with a cloud fax system through the file sync-n-share service provided by architecture 100, Anita can fax the mortgage application for Meera and associated collaterals to Leon using the same web interface that implements the file sync-n-share service.

Use Case 3: Publication of Content and Metadata to Portlets

Pure Pipes sells pipes and flanges. The sales team of Pure Pipes manages the sales-pipeline and opportunities using their Enterprise Resource Planning (ERP) system. This ERP system also provides links to a product catalog and pricing information of different products sold by Pure Pipes. The sales team relies on this catalog to arrive at product fitment for their customers and offering any discounts.

The product catalog and discounting at Pure Pipes is managed through a pricing and packaging work-flow in the company. Once approved in the pricing and packaging work-flow, a product catalog is released through the ERP system. Pure Pipes manages the pricing and packaging work-flow using an EIM system. Approved product catalogs are stored in a 'Product Catalog' repository. The Product Catalog repository is connected to the ERP system in an arrangement similar to that of architecture 100. In this example, while the ERP system is an external system in the sense that it is external to the Product Catalog repository.

Once connected, every time a product catalog is approved in the EIM system, it is published along with the associated metadata of the product catalog, to the ERP system. The sales team can now get to work with the latest product catalog and price list and learn about the various discounting available. The metadata that is published along with the product catalog allows for easy searching and categorizing of the product catalog.

As this example illustrates, an external system in this disclosure can refer to a content consumption system that operates within the same enterprise computing environment where the content provider system (e.g., a managed repository) resides or a content consumption system that operates outside of the enterprise computing environment where the managed repository resides. In addition to connecting complex enterprise software systems, embodiments can also connect applications that otherwise would not be directly communicating and/or sharing content with one another.

Use Case 4: Publication of Content and Metadata to Custom Applications

The Citizen Health Cover (CHC) covers for the medical needs of the citizens of Pandora. CHC stores all of the patient medical histories (patient records) in a Patient Health Records (PHR) content repository. Healthcare providers can access the patient records in the PHR content repository using a clinical patient record (CPR) software application running on their laptop computers. The PHR system is connected with the CPR system in an arrangement similar to that of architecture 100. CHC has mandated that a patient record be available on CPR only for a period of one week before and one week after the scheduled appointment, and all content related to patient should be removed from a healthcare provider's laptop computer after that period.

Peter, a citizen of Pandora, is consulting with Dr. Dean, a family doctor. Dr. Dean has recommended Peter to Dr. Olaf, an orthopedic. Peter has an appointment with Dr. Olaf next Friday. A week before the appointment, PHR pushes (which is a form of automated sharing by a rules-based engine) the history of Peter's x-ray records and MRI records to CPR. Dr. Olaf is able to gain a case history of the upcoming appointment with Peter. The metadata associated with the automated sharing allowed CPR to organize the x-ray and MRI images into a clear category and helped Dr. Olaf to conduct the appointment with Peter effectively.

As the above examples of use cases illustrate, embodiments disclosed herein can facilitate exchange of content between diverse content repositories and external systems of content consumption, collaboration, and storage. Benefits and advantages can include:

Content stored in repositories with previously restricted accesses can now be made available to expanded demography. Metadata published (shared) along with the content can add context to the shared content. The capabilities and feature-set of each connected system can be exposed within a variety of applications.

As the above examples alluded to, the standalone sharing module approach can automatically push or "publish" managed content to content consumption systems external to managed repositories. In some embodiments, this is achieved utilizing rule-based analyses and synchronization.

Figure 2:
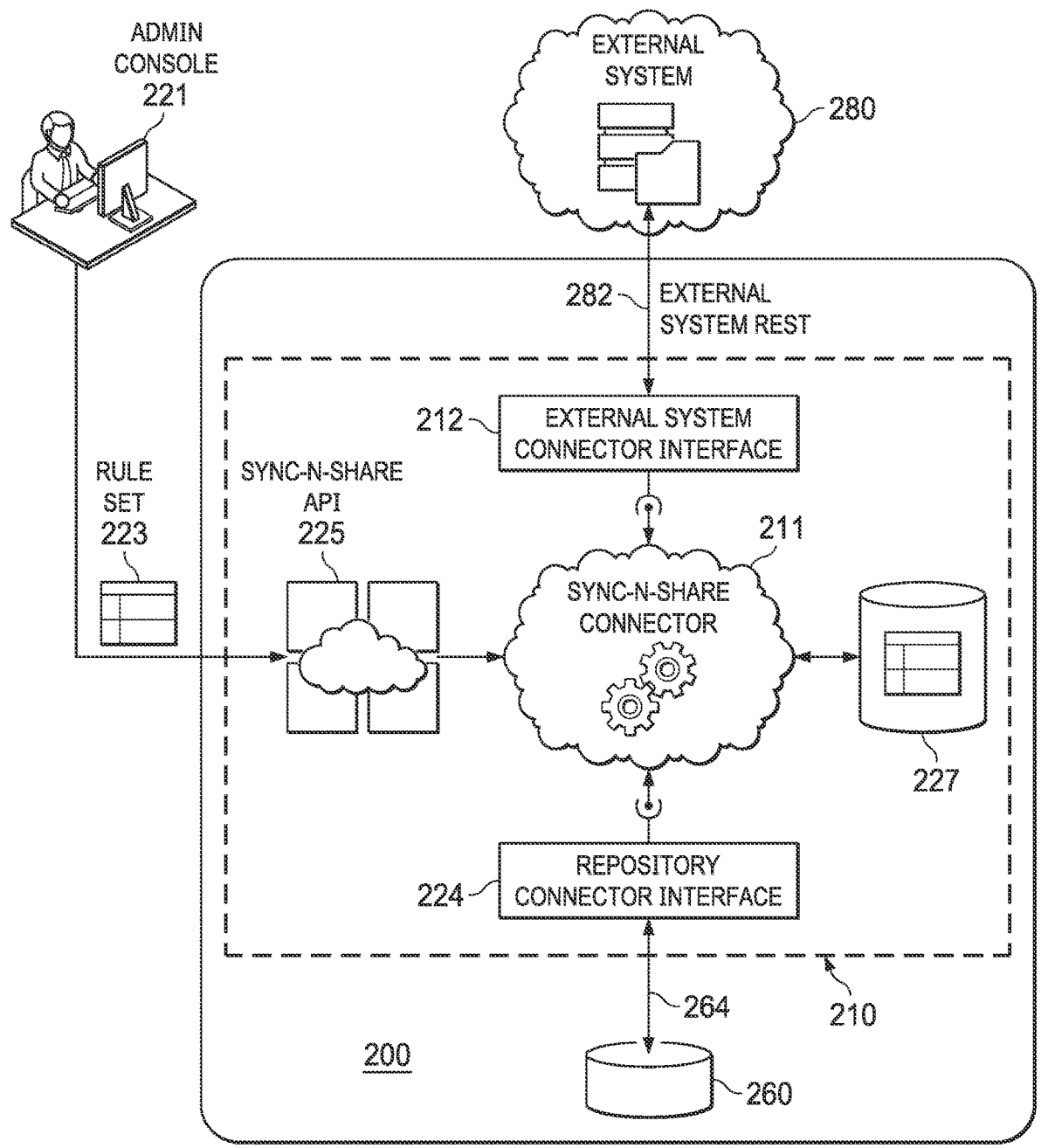
FIG. 2 depicts a diagrammatical representation of an exemplary sharing module's system architecture according to some embodiments disclosed herein.

As illustrated in FIG. 2, administrators may access sharing module 210 and create rule set 223 through admin console 221. Rule set 223 may dictate how sharing can be performed by sharing module 210 programmatically and automatically. In the example of FIG. 2, both sharing module 210 and managed repository 260 (which can be a content repository, content server, etc. managed by an EIM system) reside in enterprise computing environment 200 and external system 280 operates in a cloud computing environment outside of enterprise computing environment 200. However, in some cases, external system 280 may also operate in enterprise computing environment 200, but external to (and independently of) managed repository 260. Further, any cloud-based storage system can be an external system. An external system can be any system that operates in a network computing environment that is external to enterprise computing environment 200.

In the example of FIG. 2, managed repository 260 is communicatively connected to repository connector interface 224 of sharing module 210 through repository-specific API 264 and external system 280 is communicatively connected to external system connector interface 212 of sharing module 210 through REST API 282. Separately, admin console 221 may be operable to make API calls to sync-n-share controller or connector 211 though sync-n-share API 225.

In some embodiments, sync-n-share connector 211 may implement the execution logic (which can include a rules-based engine configured for applying rule set 223) of sharing module 210 and store tracking information (e.g., information identifying a shared item such as a content file or object, a user of an external system, a role granted to the user of the external system by a user of the managed repository, a change to the shared item, etc.) in local database 227 (local to sharing module 210). Components of sync-n-share connector 211 are further described below with reference to FIG. 3.

In some embodiments, connector interfaces 212 and 224 of sharing module 210 comprise implementations of a connecting interface that defines how to connect to sharing module 210. As a non-limiting example, in Java™, an "implements" clause can be included in a class definition to declare a class that implements an interface. This class can then be used to implement multiple interfaces, for example, by using the "implements" keyword followed by a comma-separated list of the interfaces implemented by the class. Such implementations are known to those skilled in the art and thus are not further described herein.

Here, each adapter utilized by sharing module 210 can be an implementation of a connecting interface defined in sharing module 210. Each such implementation (an instance of the connecting interface) can correspond to a one-to-one relationship between sharing module 210 and a repository (or between sharing module 210 and an external system). To this end, sharing module 210 can be characterized as an "interface" between managed repositories and content consumption systems in an adaptive content sharing architecture.

Figure 3:
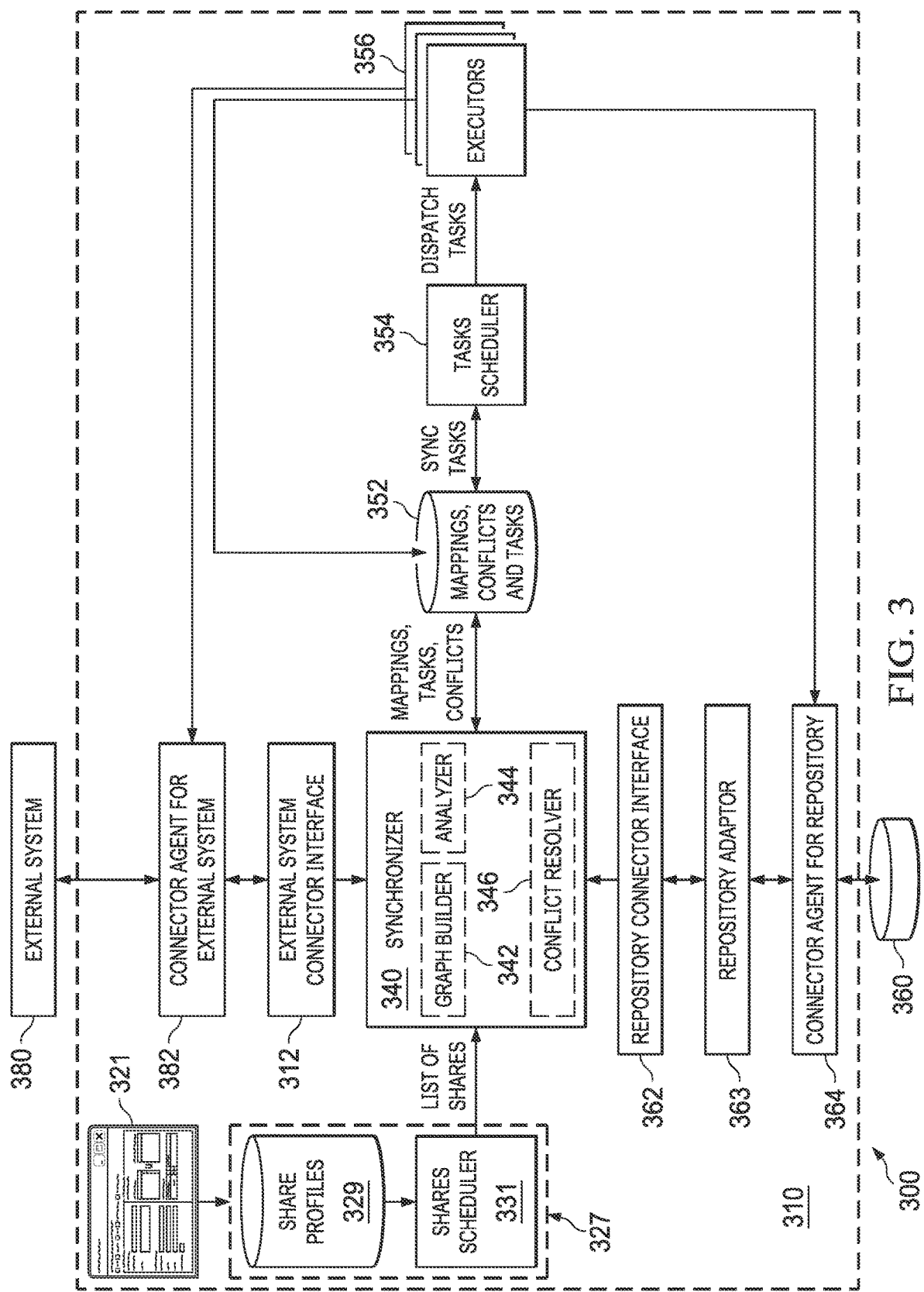
FIG. 3 depicts a diagrammatical representation of an exemplary sharing module's system components and operation flows according to some embodiments disclosed herein.

The extensible and adaptive content sharing architecture described above with reference to FIGS. 1 and 2 can be implemented in many ways. An example of adaptive content sharing architecture 300 is illustrated in FIG. 3. In the example of FIG. 3, an "interface" (or a standalone sharing module) 310 may have admin UI 321, connector agents 382, 364, and synchronizer 340. Although interface 310 is shown to interface with one content repository 360 and with one external system 380, this is for illustrative purpose only. Similar to sharing module 110 discussed above with reference to FIG. 1, interface 310 can be readily configured to interface with or otherwise connect to multiple repositories and multiple external systems, with each connection between a managed repository and an external system having a pair of connector agents respectively implemented for the managed repository and the external system to provide a one-on-one mapping between the managed repository and the external system.

Each repository adapter (e.g., repository adaptor 363) can be configured to map a common triage language (e.g., through a graph built by graph builder 342 of synchronizer 340). This mapping can be triggered by analyzer 344 due to changes made at one side (one-way sync) or both sides (two-way sync) of synchronizer 340. Changes may be caused by technical needs (e.g., versioning, editions, technical changes, etc.) at a repository (e.g., repository 360) or repositories.

At the content consumption side (e.g., external system 380), content-consumption adapters maybe utilized. This tier (or layer) of adapters can map (by configuration) to the protocols needed (e.g., communications protocols) to provide for content hand-over at each content consumption system connected to interface 310. In addition, analyzer 344 may operate as a content triaging module and together with connector agents (e.g., connector agent for external system 382, connector agent for repository 364), adapters (e.g., repository adaptor 363), and connector interfaces (external system connector interface 312 and repository connector interface 362, which are specific to synchronizer 340) can provide the ability to seek and transfer both the desired content and its associated metadata such as associated document identifiers and/or object identifiers (e.g., DocID, ObjectID, etc.).

In some embodiments, the repository (source) metadata is streamed with the content. As discussed above, an external system generally creates their own (target system) metadata, so they are not using the source metadata. Through this invention, users can now consume the capabilities of other attached systems of content consumption (e.g., EFSS, fax, etc.) from within the applications they are using. The ability to share the content can be integrated with existing applications and/or workflows. The metadata that is transferred along with the content can provide context to the published content and derive related benefits In some embodiments, admin UI 321 is communicatively connected to local database 327 which stores share profiles 329. An administrator can set up content sharing rules applicable to share profiles. These are not user profiles. Each share has a rule set. A share can represent a folder or directory in a managed repository or any data source selected by the administrator. Different shares may have different rule sets, or share the same rules, for controlling when and how content can be shared. The rules may also specify content types. For example, a rule may specify that a share should have only PDF files.

Shares scheduler 331 may also reside on local database 327 and may contain schedules specifying how and when content can be automatically and programmatically shared per share profiles or rules 329. Shares scheduler 331 may also be used for scheduling when syncing is to occur, although the type of syncing is dictated by the type of rule set (e.g., one-way sync or two-way sync) applicable to the share being synced. The instruction received by admin UI 321 from an administrator is communicated to synchronizer 340 through shares scheduler 331 in the form of a list of shares. The list of shares may contain information on a folder (one share) of files of what can be shared per rules that are applicable to the share.

In response, graph builder 342 of synchronizer 340 is operable to build a graph of objects (e.g., content files) per share in the list of shares received from shares scheduler 331. This graph is used by synchronizer 340 to track changes to the objects in a corresponding share. This is explained further below.

Once a share in a managed repository (e.g., a folder in managed repository 360) is specified (e.g., through admin 321) for sharing through an external system (e.g., external system 380), everything in the share is published from the managed repository to the external system through interface 310. More specifically, content and its associated metadata may be retrieved by synchronizer 340 from managed repository 360 through connector agent for repository 364, repository adaptor 363, and repository connector interface 362 and provide to external system 380 through external system connector interface 312 and connector agent for external system 382.

As discussed above, once a share is published, synchronizer 340 may operate to monitor and determine whether any change is made to the shared content. Determination of whether any change occurred to the shared content can be done by polling. In some embodiments, polling can be triggered by one-way sync or two-way sync. Whether a one-way sync or a two-way sync is performed may depend on whether a one-way sync rule set or a two-way sync rule set is applicable to the share to be synced. For example, if a one-way sync rule set dictates that only the version of the shared content in external system 380 can be modified (e.g., the version of the shared content in managed repository 360 is locked from editing), synchronizer 340 may operate to ping external system 380 to get an update on the share. When this happens, graph builder 342 is operable to build another graph for the share. The two graphs built by graph builder 342 for the same share at different times are compared by analyzer 344 to detect any differences.

In some embodiments, when a change to the share is detected, analyzer 344 operate to determine any conflict exists (e.g., what files in the share have been changed since the last sync (publish), what are the changes, etc.). For example, if a file name has been changed by a user at external system 380 from "XYZ.doc" to "ABC.doc," managed repository 360 will not recognize "ABC.doc." Analyzer 344 is operable to communicate its finding to conflict resolver 346. Conflict resolver 346 is operable to find a solution to correct a version miss-match.

Version miss-matches may also occur in a two-way sync scenario. That is, shared content may be modified by a user using external system 380, a user using managed repository 360, or users on both sides. Synchronizer 340 may operate to poll the list of shares from local database 327 and also poll external system 380 to get an update on the shares that had been published from managed repository 360 to external system 380.

Suppose a file ("XYZ.doc" version 1.0) in a share subject to a two-way sync rule set was first published from managed repository 360 to external system 380. After that, a user of external system 380 created a new version of the file in external system 380 and named it "ABC.doc." At this time, managed repository 360 does not have any version of the file named "ABC.doc." Meanwhile, a user of managed repository 360 updated the file ("XYZ.doc" version 2.0) stored in managed repository 360. By analyzing the graphs that graph builder 342 has built for the share at different times for different systems (in this example, two for managed repository 360 and one for external system 380), analyzer 344 is operable to determine that the shared content ("XYZ.doc" version 1.0) in managed repository 360 has been changed (to "XYZ.doc" version 2.0) in managed repository 360 and also that the shared content in external system 380 has been modified as "ABC.doc." This detection is possible by traversing each graph and compare nodes (objects) in the respective graphs.

Because the file name has been changed, managed repository 360 does not recognize the file. Likewise, because the file in managed repository 360 has been updated to version 2.0, external system 380 does not recognize the updated file. Thus, the updated file (version 2) in managed repository 360 needs to be synced to external system 380 and the file with the modified name needs to be synced from external system 380 to managed repository 360. This is an example of a two-way sync. Analyzer 344 can identify conflicts such as these and communicate them to conflict resolver 346.

In some embodiments, conflict resolver 346 is operable to handle finding a resolution for a conflict detected by analyzer 344. In some embodiments, conflict resolver 346 may create a new object or conflict file. This conflict file can have a specific file type, for instance, a particular file extension (e.g., ".conflict"). As a non-limiting example, conflict resolver 346 may change the extension from "ABC.doc" to "ABC.conflict" and send the "ABC.conflict" file to a user (or notify the user) who can then review and resolve the conflict. These mappings, conflicts, and tasks 352 are performed by conflict resolver 346 per tasks scheduler 354. Executors 356 are handlers for conflict resolver 346.

Figure 4:
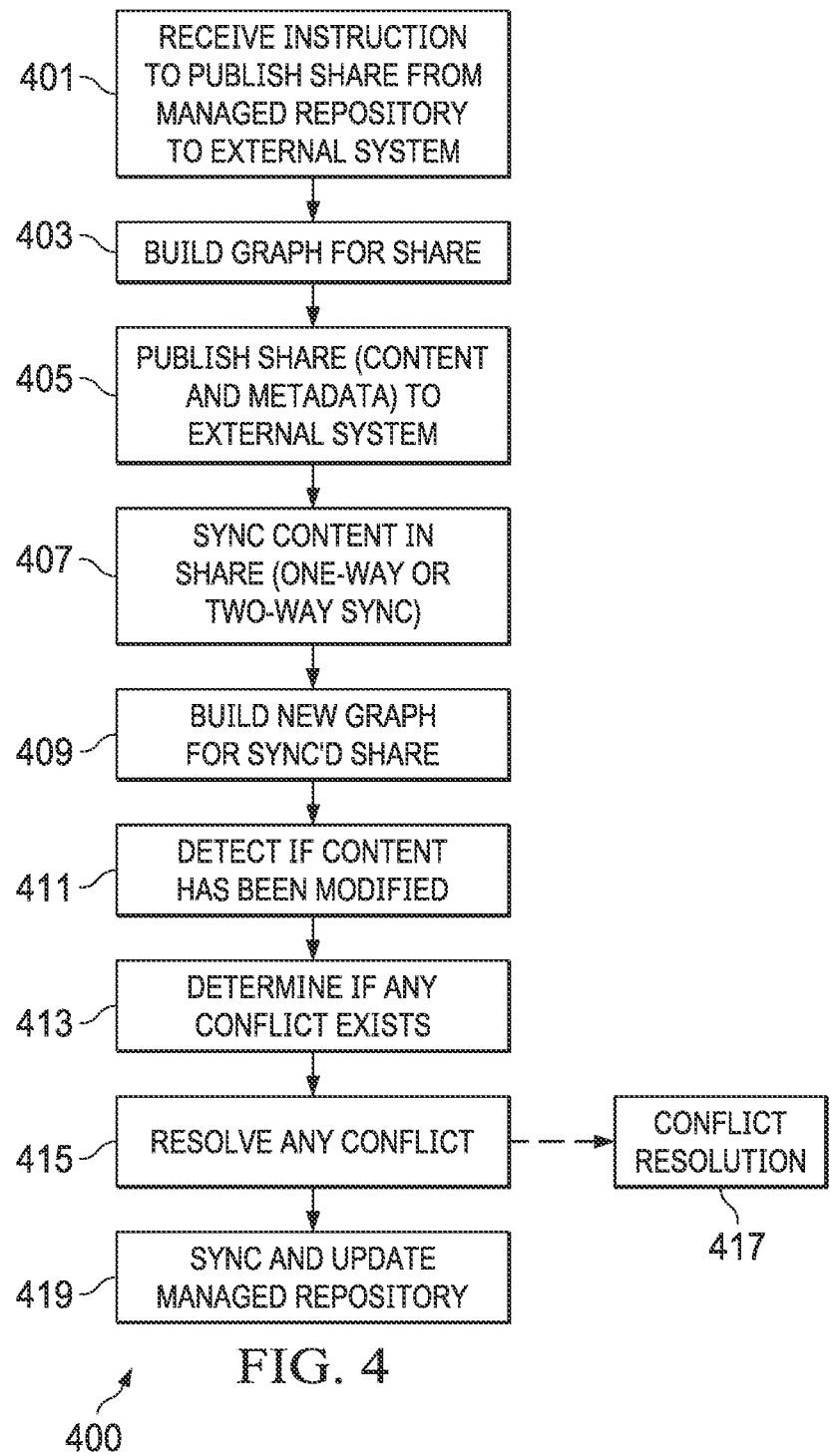
FIG. 4 depicts a flow chart illustrating a method for content sharing through an external systems according to some embodiments disclosed herein.

FIG. 4 depicts a flow chart illustrating a method for content sharing through an external systems according to some embodiments disclosed herein. In some embodiments, method 400 may comprise receiving, by a sharing module embodied on a non-transitory computer readable medium, an instruction to publish a share (401). As discussed above, a share may represent a folder or a directory in a managed repository. The managed repository may be managed by an EIM system operating in an enterprise computing environment.

The sharing module may implement an embodiment of sharing module 110, sync-n-share connector 211, or synchronizer 340 described above. The instruction to publish a share may be received through an administrator UI such as admin console 221 or admin UI 321. The instruction may be stored in a local database such as database 227 or database 327 accessible by the sharing module and may be provided to the sharing module using a scheduler such as shares scheduler 331. The instruction may contain a share profile (e.g., share profile 329) for a list of share(s) and content sharing rules (e.g., rule set 223) defined by an administrator as applicable to the list of shares.

In response, a graph builder (e.g., graph builder 342) may build graphs for the list of shares on a per-share basis (403). Each graph contains objects representing files in a particular share and their relationships. The graph builder may be part of the sharing module.

The sharing module then publishes the share to an external system as described above (405), with everything in it, including the files and metadata associated with the files. Publication by the sharing module to an external system may include providing information identifying a user of the external system and a role granted to the user of the external system by a user of the EIM system, for example, when the user of the EIM system places a file in the share.

Responsive to a user instruction (e.g., to update a share) or automatically (e.g., per a scheduled event), the sharing module may operate to communicate with the managed repository and/or the external system and obtain (sync) a current version of the share (407). Whether to communicate with the managed repository, the external system, or both, may depend on whether the share is subject to a one-way sync rule set or a two-way sync rule set.

As discussed above, communication between the sharing module and the managed repository is done through two special APIs—a sharing module API and a repository-specific API. The sharing module API is configured for interfacing between the sharing module and the repository-specific API. The repository-specific API is configured for interfacing the sharing module API and the managed repository. Likewise, communication between the sharing module and the external system is done through two special APIs—a sharing module API and an external system-specific API. The sharing module API is configured for interfacing between the sharing module and the external system-specific API. The external system-specific API is configured for interfacing the sharing module API and the external system.

For each share that has been synced back to the sharing module, the graph builder is operable to build a new graph (409). An analyzer (e.g., analyzer 344) of the sharing module is operable to compare the graphs built for the same share at different times (e.g., when the share was first published to the external system and when the share is synced back to the sharing module from the external system or the managed repository) and/or synced from different sources. As described above, the analyzer may operate to detect any changes made to content in the share (411) and determine if any conflict caused by such changes exists (413). If so, the analyzer may call a conflict resolver (e.g., conflict resolver 346) to revolve any conflict (e.g., a version miss-match) found by the analyzer. In turn, the conflict resolver may be operable to process versions of the same file (e.g., by creating a conflict file with a special file extension) for conflict resolution (415). For example, the conflict resolver may prepare a request containing information about and/or links to both versions for a user of the managed repository (e.g., an owner of the file at issue) to decide which, if any, version is to be stored (synced) back to the managed repository (417). The correct version is then synced to the backend to update the version in the managed repository (419).

Figure 5:
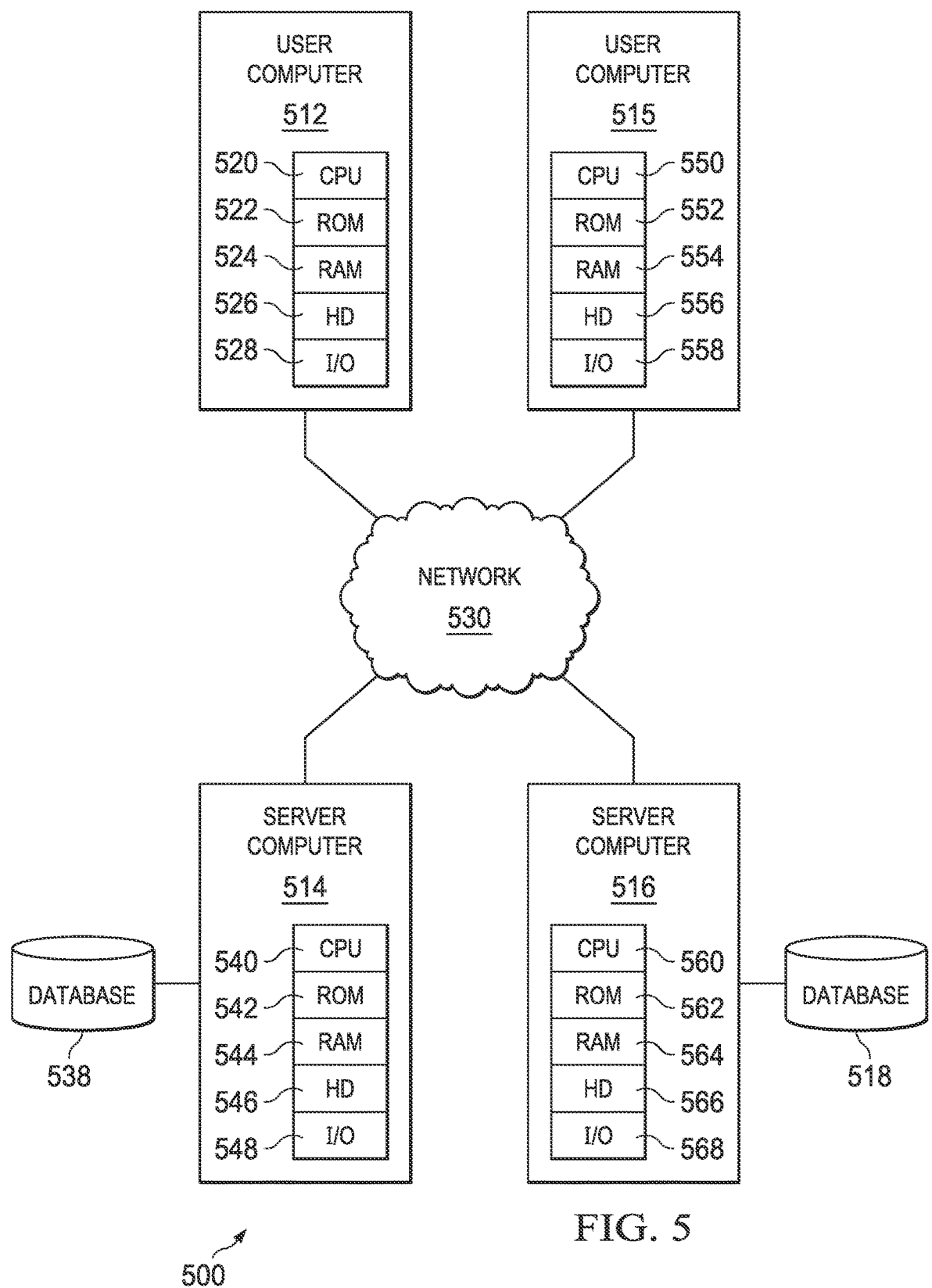
FIG. 5 depicts a diagrammatic representation of a distributed network computing environment where embodiments disclosed can be implemented.

FIG. 5 depicts a diagrammatic representation of a distributed network computing environment where embodiments disclosed can be implemented. In the example of FIG. 5, network computing environment 500 may include network 514 that can be bi-directionally coupled to user computer 512, user computer 515, server computer 514, and server computer 516. Server computer 514 can be bi-directionally coupled to database 538 and server computer 516 can be bi-directionally coupled to database 518. Network 530 may represent a combination of wired and wireless networks that network computing environment 500 may utilize for various types of network communications known to those skilled in the art.

For the purpose of illustration, a single system is shown for each of user computer 512, user computer 515, server computer 514, and server computer 516. However, within each of user computer 512, user computer 515, server computer 514, and server computer 516, a plurality of computers (not shown) may be interconnected to each other over network 530. For example, a plurality of user computers may be communicatively connected over network 530 to server computer 514 that operates an IM system in an enterprise computing environment and a plurality of user computers may be communicatively connected over network 530 to server computer 516 implementing an external system external to the enterprise computing environment, the IM system, and/or database 538 managed by the IM system.

User computers 512 may include data processing systems for communicating with server computer 514. Likewise, user computers 515 may include data processing systems for communicating with server computer 516.

User computer 512 can include central processing unit ("CPU") 520, read-only memory ("ROM") 522, random access memory ("RAM") 524, hard drive ("HD") or storage memory 526, and input/output device(s) ("I/O") 528. I/O 529 can include a keyboard, monitor, printer, electronic pointing device (e.g., mouse, trackball, stylus, etc.), or the like. User computer 512 can include a desktop computer, a laptop computer, a personal digital assistant, a cellular phone, or nearly any device capable of communicating over a network. User computer 515 may be similar to user computer 512 and can comprise CPU 550, ROM 552, RAM 554, HD 556, and I/O 558.

Likewise, server computer 514 may include CPU 540, ROM 542, RAM 544, HD 546, and I/O 548 and server computer 516 may include CPU 560, ROM 562, RAM 564, HD 566, and I/O 568. Server computers 514 and 516 may each include one or more backend systems configured for providing an instance of an application to user computers 512 over network 530. Many other alternative configurations are possible and known to skilled artisans.

Each of the computers in FIG. 5 may have more than one CPU, ROM, RAM, HD, I/O, or other hardware components. For the sake of brevity, each computer is illustrated as having one of each of the hardware components, even if more than one is used. Each of computers 512, 514, 515, and 516 is an example of a data processing system. ROM 522, 542, 552, and 562; RAM 524, 544, 554, and 564; HD 526, 546, 556, and 566; and database 518 and 538 can include media that can be read by CPU 520, 540, 550, or 560. Therefore, these types of memories include non-transitory computer-readable storage media. These memories may be internal or external to computers 512, 514, 515, or 516.

Portions of the methods described herein may be implemented in suitable software code that may reside within ROM 522, 542, 552, or 562; RAM 524, 544, 554, or 564; or HD 526, 546, 556, or 566. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, by a sharing module executing on a processor through a repository adapter, an instruction to publish a share in a repository residing in an enterprise computing environment to a content consumption system external to the repository, wherein the sharing module is adapted for multiple-to-multiple connections among a plurality of repositories through repository adapters and a plurality of content consumption systems through content consumption system adapters;
   retrieving, by the sharing module through the repository adapter, objects and metadata from the share in the repository residing in the enterprise computing environment;
   communicating, by the sharing module through a content consumption system adapter, the objects and the metadata retrieved from the share in the repository residing in the enterprise computing environment to the content consumption system external to the repository to thereby publish the share to the content consumption system external to the repository, wherein the metadata provides context to the objects thus published;
   monitoring, by the sharing module, any changes to the share in the repository residing in the enterprise computing environment and in the content consumption system external to the repository; and
   responsive to detecting a change to the share in the repository residing in the enterprise computing environment or in the content consumption system external to the repository, syncing, by the sharing module, the share in the repository residing in the enterprise computing environment and in the content consumption system external to the repository.

2. The method according to claim 1, wherein the repository adapter is configured for mapping a triage language for conflict resolution, the mapping triggered by the change to the share.

3. The method according to claim 1, wherein the content consumption system adapter is configured for mapping a communications protocol for content consumption by the content consumption system.

4. The method according to claim 1, wherein the repository adapter comprises a sharing module application programming interface (API) and an API specific to the repository.

5. The method according to claim 1, wherein the content consumption system adapter comprises a sharing module application programming interface (API) and an API specific to the content consumption system.

6. The method according to claim 1, wherein the instruction is received from a rules-based engine based on a rule which specifies how the sharing module programmatically automatically publishes the share to the content consumption system external to the repository.

7. The method according to claim 1, further comprising:
   storing tracking information in a database local to the sharing module, the tracking information including information identifying a shared object, information identifying a user of the content consumption system, information identifying a role granted to the user of the content consumption system by a user of the repository, a change to the shared object, or a combination thereof.

8. A system, comprising:
a processor;
a non-transitory computer-readable medium; and
stored instructions translatable by the processor for causing a sharing module to perform:
receiving, through a repository adapter, an instruction to publish a share in a repository residing in an enterprise computing environment to a content consumption system external to the repository, wherein the sharing module is adapted for multiple-to-multiple connections among a plurality of repositories through repository adapters and a plurality of content consumption systems through content consumption system adapters;
retrieving, through the repository adapter, objects and metadata from the share in the repository residing in the enterprise computing environment;
communicating, through a content consumption system adapter, the objects and the metadata retrieved from the share in the repository residing in the enterprise computing environment to the content consumption system external to the repository to thereby publish the share to the content consumption system external to the repository, wherein the metadata provides context to the objects thus published;
monitoring any changes to the share in the repository residing in the enterprise computing environment and in the content consumption system external to the repository; and
responsive to detecting a change to the share in the repository residing in the enterprise computing environment or in the content consumption system external to the repository, syncing the share in the repository residing in the enterprise computing environment and in the content consumption system external to the repository.

9. The system of claim 8, wherein the repository adapter is configured for mapping a triage language for conflict resolution, the mapping triggered by the change to the share.

10. The system of claim 8, wherein the content consumption system adapter is configured for mapping a communications protocol for content consumption by the content consumption system.

11. The system of claim 8, wherein the repository adapter comprises a sharing module application programming interface (API) and an API specific to the repository.

12. The system of claim 8, wherein the content consumption system adapter comprises a sharing module application programming interface (API) and an API specific to the content consumption system.

13. The system of claim 8, wherein the instruction is received from a rules-based engine based on a rule which specifies how the sharing module programmatically automatically publishes the share to the content consumption system external to the repository.

14. The system of claim 8, wherein the stored instructions are further translatable by the processor for causing the sharing module to perform:
storing tracking information in a database local to the sharing module, the tracking information including information identifying a shared object, information identifying a user of the content consumption system, information identifying a role granted to the user of the content consumption system by a user of the repository, a change to the shared object, or a combination thereof.

15. A computer program product comprising a non-transitory computer-readable medium storing instructions translatable by a processor for causing a sharing module to perform:
receiving, through a repository adapter, an instruction to publish a share in a repository residing in an enterprise computing environment to a content consumption system external to the repository, wherein the sharing module is adapted for multiple-to-multiple connections among a plurality of repositories through repository adapters and a plurality of content consumption systems through content consumption system adapters;
retrieving, through the repository adapter, objects and metadata from the share in the repository residing in the enterprise computing environment;
communicating, through a content consumption system adapter, the objects and the metadata retrieved from the share in the repository residing in the enterprise computing environment to the content consumption system external to the repository to thereby publish the share to the content consumption system external to the repository, wherein the metadata provides context to the objects thus published;
monitoring any changes to the share in the repository residing in the enterprise computing environment and in the content consumption system external to the repository; and
responsive to detecting a change to the share in the repository residing in the enterprise computing environment or in the content consumption system external to the repository, syncing the share in the repository residing in the enterprise computing environment and in the content consumption system external to the repository.

16. The computer program product of claim 15, wherein the repository adapter is configured for mapping a triage language for conflict resolution, the mapping triggered by the change to the share.

17. The computer program product of claim 15, wherein the content consumption system adapter is configured for mapping a communications protocol for content consumption by the content consumption system.

18. The computer program product of claim 15, wherein the repository adapter comprises a sharing module application programming interface (API) and an API specific to the repository and wherein the content consumption system adapter comprises a sharing module application programming interface (API) and an API specific to the content consumption system.

19. The computer program product of claim 15, wherein the instruction is received from a rules-based engine based on a rule which specifies how the sharing module programmatically automatically publishes the share to the content consumption system external to the repository.

20. The computer program product of claim 15, wherein the instructions are further translatable by the processor for causing the sharing module to perform:
storing tracking information in a database local to the sharing module, the tracking information including information identifying a shared object, information identifying a user of the content consumption system, information identifying a role granted to the user of the content consumption system by a user of the repository, a change to the shared object, or a combination thereof.

* * * * *